United States Patent [19]
Abergel

[11] Patent Number: 4,594,788
[45] Date of Patent: Jun. 17, 1986

[54] LIGHT-TIGHT COMBINATION MICROGRAPHIC MAP-READER PROTRACTOR COMPASS

[76] Inventor: Reuven A. Abergel, 56 Gardner St., Apt. 16A, Allston, Mass. 02134

[21] Appl. No.: 740,037

[22] Filed: May 31, 1985

[51] Int. Cl.$^4$ .................. G03B 21/00; G02B 27/02
[52] U.S. Cl. .................................. 33/275 R; 33/272; 33/354; 350/241; 353/11
[58] Field of Search .................. 33/275 R, 262, 272, 33/274, 347, 348, 354, 1 C; 350/241; 353/11; 40/362, 367

[56] References Cited

U.S. PATENT DOCUMENTS

| | | | |
|---|---|---|---|
| 2,677,183 | 5/1954 | Brenner | 33/272 |
| 3,561,153 | 2/1971 | Harper | 350/241 |
| 4,116,533 | 9/1978 | Nerlich | 350/241 |
| 4,149,783 | 4/1979 | Latady | 353/11 |
| 4,234,244 | 11/1980 | Klein | 350/241 |
| 4,402,140 | 9/1983 | Nagae | 33/272 |
| 4,422,738 | 12/1983 | Steele | 353/11 |
| 4,530,570 | 7/1985 | Vitac | 350/241 |

FOREIGN PATENT DOCUMENTS 1293808 10/1972 United Kingdom .................. 33/272

*Primary Examiner*—Willis Little
*Attorney, Agent, or Firm*—Donald W. Meeker

[57] ABSTRACT

A movable film cartridge with at least one view superimposed by a protractor image on transparent film is further provided with a compass viewed through a prism at an edge of the field of view of the film containing a map or aerial view image. A double spool cartridge contains the film and moves the film from one spool to the other reversibly by a hand-turned knob or motor. The cartridge moves vertically within the light-tight casing housing the cartridge. An eyepiece with a sealed double flap opens for viewing with the eyepiece tightly sealed against the face of a user. A button operated by the user's nose or bridge of the nose turns the interior light on for light-tight viewing. Magnified viewing of the microphotographic film may be through a single lens in a wrist mounted embodiment or through a double viewing system for stereo vision with images recorded from two different perspectives separated by the distance between the eyes of the user. Additional information may be recorded on the frames between the stereo images on the film. Vials of acid mounted interiorly may be broken for film destruction in security tight situations. A light-weight plastic casing and lens system alternately uses film mounted on circular discs. Both cartridges and discs are replaceable in the casings.

19 Claims, 11 Drawing Figures

LIGHT-TIGHT COMBINATION MICROGRAPHIC MAP-READER PROTRACTOR COMPASS

BACKGROUND OF THE INVENTION

1. Technical Field

The present invention relates to map-reading navigational aids and in particular to a stereo micrographic map-reader with a built-in compass, protractor and internal light source wherein the casing for the map-reader is completely light-tight.

2. Background Art

Maps are generally printed on large cumbersome sheets of paper which must be folded in an ornate fashion for relatively compact storage. Trying to read such a map outdoors in the wind represents a considerable nuisance, and trying to read a large map in a confined space, such as a vehicle represents another difficult problem in trying to spread the map out. Reading printed maps at night requires a substantial amount of light directed on the map, which interferes with pilots or drivers beside the map reader and reveal the user's position in hunting or combat.

Maps are two dimensional and do not give a sense of depth to the landscape being studied. Contour lines must be relied upon to give some idea of elevational differences.

To establish direction and orientation, it is necessary to use a map with a separate compass, use the compass to establish the magnetic North, and then find North on the map and orient the map accordingly with an allowance for the difference between true North and magnetic North.

To determine distances with a map it is necessary to use a separate protractor or other measuring instrument applied to the map taking the scale of the map into consideration.

Other lighted viewing devices do not provide safety in that the light is always visible through loading slots and around the eyepiece.

DISCLOSURE OF INVENTION

A compact lightweight case houses all of the components of the present invention, which is hand held and may be carried easily in a pocket or small carrying pouch. In one embodiment, the invention may be worn on the wrist. Micrographic printing and magnifying lenses enable substantial amounts of information to be stored and utilized in a very small amount of space.

Housing the elements in a completely light-tight case with a self-contained light source enables use of the invention at any time, day or night and in any location without danger of disturbing neighboring activity or revealing poisition in hunting or combat.

Stereo vision, afforded by viewing two images which were recorded from a perspective which differs one from the other by the distance between human eyes, enables very accurate determination of differences in elevation in land forms and structures, a great aid in direction finding and route and site selection.

Incorporating a compass within the device, which compass direction is readable through the viewing elements simultaneously with the map being viewed instantly establishes the correct map orientation, or zeroing of the map, so that the user in the field can actually automatically orient him or her self in accurate alignment between the map and the actual landscape surroundings.

An internal protractor viewable through the lenses as an overlay on the micro-map permits instant and very accurate measurement of relative distances and orientations on the map with no need for other instrumentation.

Additional information may be printed on a film strip between the map pairs to assist the user in whatever activity the user intends to carry out on the landscape of the map.

In a film strip cartridge carrying secret information, chemicals encapsualted within the cartridge may be used to destroy the film instantly should the user be discovered by the enemy in combat.

A disc with multiple micrographic images in pairs on opposite sides of the disc may be used with an inexpensive light weight viewer using plastic lenses.

BRIEF DESCRIPTION OF THE DRAWINGS

These and other details and advantages of my invention will be described in connection with the accompanying drawings, which are furnished only my way of illustration and not in limitation of the invention, and in which drawings.

BEST MODE FOR CARRYING OUT THE INVENTION

Figure 1:
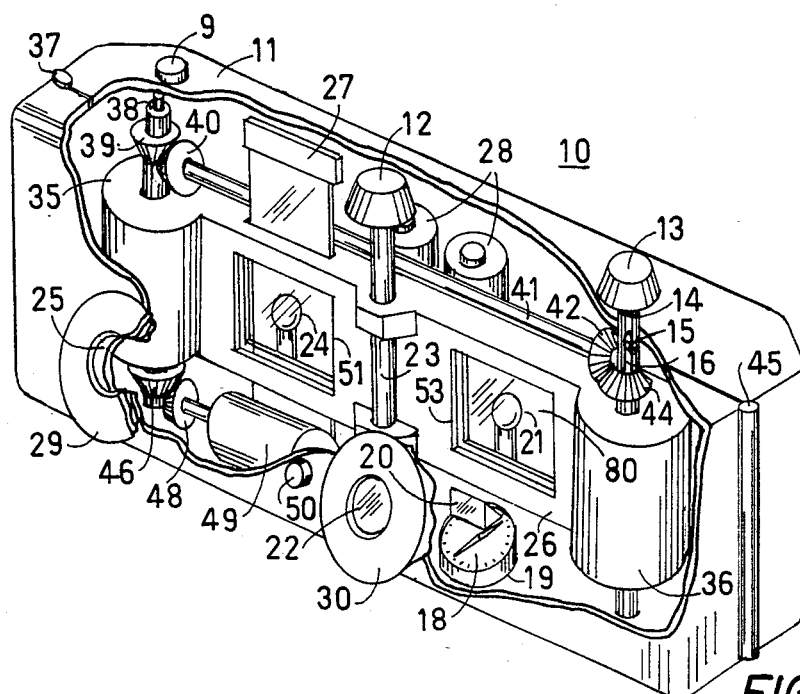
FIG. 1 is a perspective view in partial section of the preferred embodiment of the invention.

In FIG. 1 an opaque casing 11 provides a light-tight housing for the elements of the combination micrographic map-reader protractor compass, hereafter called the invention 10. Two openings 22 and 25 in eyepieces 29 and 30, respectively, are spaced apart by the average distance between two eyes of a human and serve as viewers for the user to look into the casing.

Adjustably positioned within the casing on a vertical threaded post 23 a film cartridge 26 serves to roll a strip of film 80 from a first spool 35 at one end to a second spool 36 at an opposite end of the cartridge reversibly by means of externally mounted control knob 13. The film advance control knob 13 is attached to a telescoping shaft 14 with a protruding pin 15 which fits slidably within a vertical slot 16 in a larger shaft which controls the advance of the film into the second spool 36. As the film advance knob 13 rotates to advance film into the second spool 36 another telescoping post 38 is automatically turned by the horizontal turning rod 41 and double bevel gears 42 and 44 at the control shaft 14 and double bevel gears 39 and 40 at the other shaft 38 interconnected by the horizontal turning rod 41, so that the film is turned out of the first spool 35. Reversing the direction of turning the film advance control knob reverses the direction of advance of the film from the second spool 36 back into the first spool 35.

Figure 6:
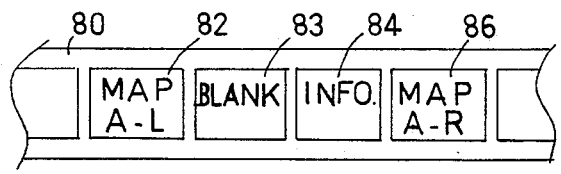
FIG. 6 is an elevational view of a strip of film for the preferred embodiment of the invention.

A second externally mounted control knob 12 turns the vertical threaded post 23 to move the film cartridge 26 vertically within the casing to view various segments of the maps and to align the maps with the protractor 27 which is printed on a thin strip of transparent material which may be attached in a stationary fashion to the casing and which protractor extends through the cartridge coincident with one of the viewing frames 51 to appear through the viewing opening as overlaying the map, as seen in FIG. 6.

An alternative automatic control of film advance provides a small turning motor 50 powered by the same battery source 28 as the light bulbs 21 and 24. A push button 9 on the exterior of the casing may be wired to the control motor for automatic film advance through bevel gears 46 and 48 connected with shaft 38. The casing 11 swings open on a hinge 45 when released by button 37 to permit changing of the repalaceable film strip cartridge 26.

Figure 7:
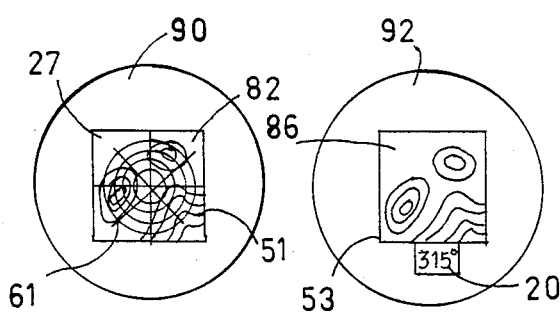
FIG. 7 is an elevational view showing the appearance of the map through the viewing openings with the invention pointed directly toward the Northwest (315°) on the compass.

Through the opposite viewing opening 53, as seen in FIG. 7 a prism 20 directs the image of a compass reading from the face 18 of a standard compass 19 mounted directly below the prism. Therefore both the protractor and the compass may be viewed while reading the map. Immediate orientation and distance readings are thus established.

Figure 5:
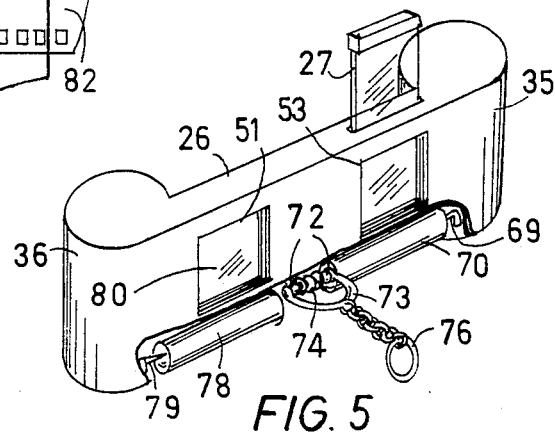
FIG. 5 is a perspective view of the film cartridge for the preferred embodiment of the invention.

As seen in FIGS. 1 and 5 an additional pair of glass vials 70 and 78 are secured to the base of the cartridge with one end of each vial extending into each of the two spools 35 and 36 contacting sharp points 69 and 79 respectively. Two metal balls 72 are mounted at an opposite end of each vial straddling a powerful spring 74 between the balls. A ring 76 extends out of the casing by means of a chain or flexible member through a light-tight opening. Should a soldier be discovered by enemy troops in combat, the ring may be pulled to release the balls held by a forked retainer 73 attached to the chain and ring 76. The balls will strike each of the two vials 70 and 78 forcing the vials against the points 69 and 79 thereby breaking open the vials to spill acid from the vials into the spools and onto the film in the frames by inverting the casing, or the vials may be mounted on top of the cartridge to eliminate the need to invert the casing.

Figure 4:
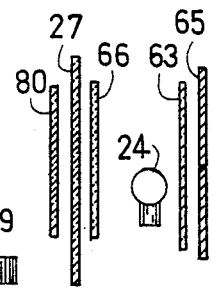
FIG. 4 is a schematic view in section of the primary viewing elements of the invention.

In FIG. 4 the alignment of the focal elements of the invention are diagrammed. The light 24 illuminates the film 80 through a light spreader sheet 66 mounted between the film and the light. The protractor 27 is positioned between the film and the light spreader. As the superimposed image of the protractor 27 and the film 80 is viewed through the magnifying lens 62 in the eyepiece, the prism 20 reflects the image of the reading from the compass 19 below in the lower part of the field of vision of the map being viewed. The compass may be mounted on the same side as the protractor. Alternately, light may be admitted through clear window 63 by displacing light-tight shutter 65.

Figure 3:
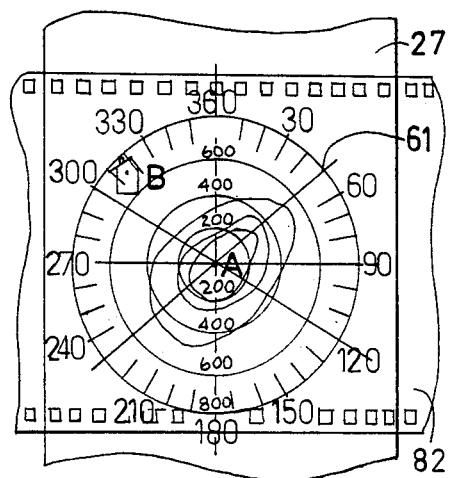
FIG. 3 is an exploded elevational view through the lens showing the view of the film map superimposed on the protractor.

In FIG. 3 the film frame 82 is viewed through the protractor 27 with lines 61 printed on a transparent sheet indicating 360° of angular measurement and concentric distance rings. The film 82 is positioned in this case so that a hilltop A is positioned in the center. Another feature such as a house B is measured to be 700 yards away at an azimuth of 315°.

In FIGS. 6 and 7 the film strip 80 is divided into a series of frames 82, 83, 84 and 86. Two views of the same map 82 and 86 recorded from a difference of perspective equal to the distance between the two eyes are also positioned on the strip separated by the distance between the two eyes. When the two views 82 and 86 are observed through the two viewing openings, the map or aerial view appears in three dimensions to the viewer with all of the topographic features appearing to extend from the film surface. Additional information regarding the route being followed or the site being developed may be recorded on the frames 83 and 84 between the map frames to assist the user.

Figure 8:
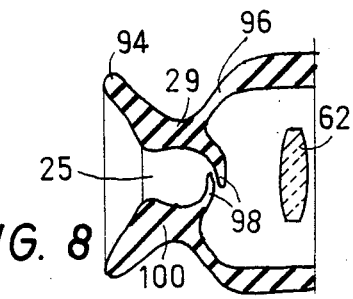
FIG. 8 is a cross-sectional view of the eyepiece of the invention with the light tight flaps closed.
Figure 9:
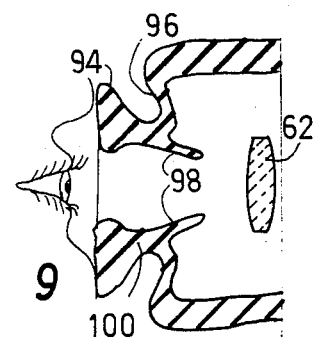
FIG. 9 is a cross-sectional view of the eyepiece of the invention with a user's eye in position ond the light tight flaps forced upon from the pressure of the user's face against the eyepiece.

In FIGS. 8 and 9 the eyepiece 29 is provided with a pair of flexible flaps 98 which normally overlap as in FIG. 8 to maintain a light-tight seal. Upon pressure by the face of a user, as in FIG. 9, against the outer rim 94 of the eyepiece, a stiff portion 100 inward of the rim forces the flaps 98 open while the thin surrounding cup 96 bends under the pressure, thereby opening the view through the lens 62 with a light-tight seal between the face of the user and the eyepiece. The lights inside only turn on when the user's nose or bridge of the nose touches the on/off button 50 as seen in FIG. 1 on the outside of the casing between the viewing openings.

Figure 2:
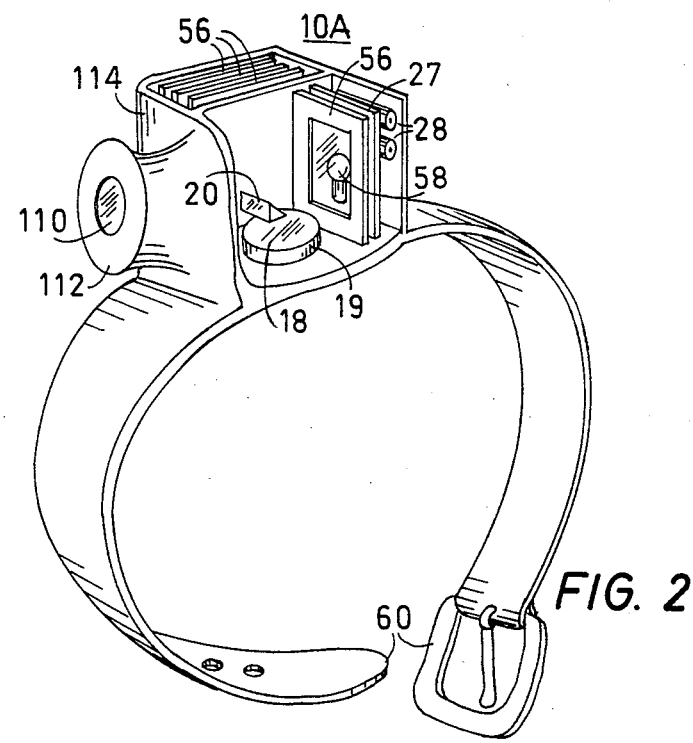
FIG. 2 is a perspective view in partial section of an alternate embodiment of the invention mounted on a wrist strap.

In FIG. 2 an alternate embodiment provides a single opening 110 for viewing through an eyepiece 112. This more compact embodiment of the invention 10A may be mounted on a wrist band 60 to be worn by the user. Single micrographic slides 56 contain the map or other information in this system, and a storage space for extra slides 114 may be positioned on the side of the casing, which is light-tight as in the preferred embodiment. Protractor 27A and compass 19 with prism 20 may be provided in this embodiment also.

Great versatility and accuracy are provided by the invention, enabling great amounts of accurate information to be stored and viewed conveniently with direct reading on location possible at all times in the proper orientation. For extremely high magnification requirements, for viewing microfiche for example, a microscopic eyepiece would replace the conventional lens.

Figure 10:
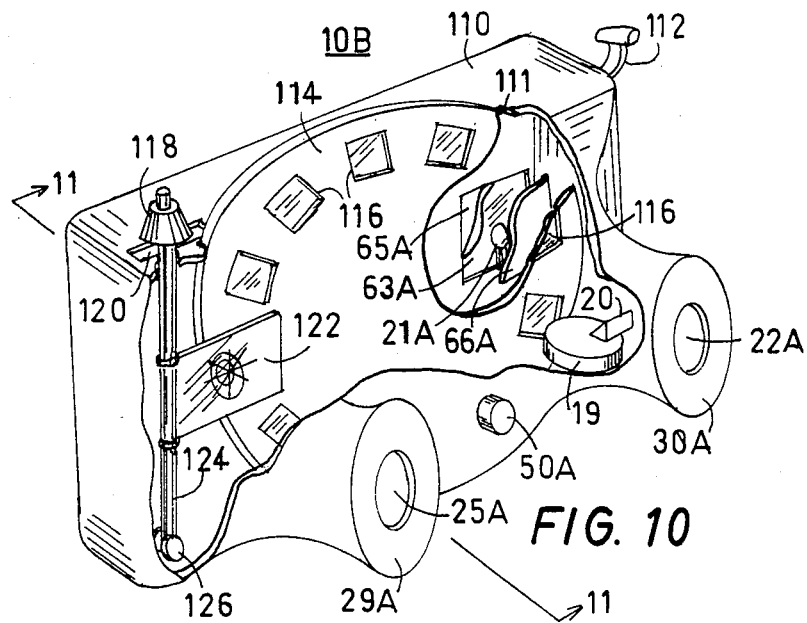
FIG. 10 is a perspective view in partial section of an alternate embodiment of the invention having film mounted on a circular disc in pairs on opposing edges of the disc and used in an inexpensive light-weight viewer with plastic lenses.
Figure 11:
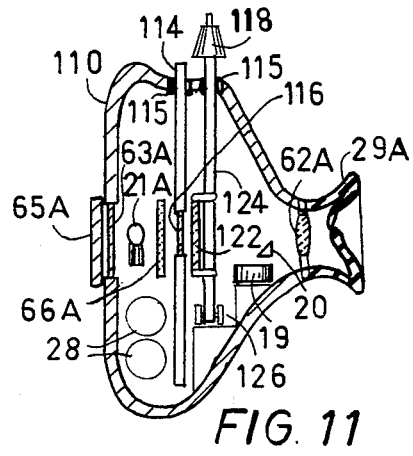
FIG. 11 is a cross-sectional view of the alternate embodiment using a disc taken through 11—11 of FIG. 10.

In FIGS. 10 and 11 an alternate embodiment of the invention 10B uses a circular disc 114 with transparent film frames 116 positioned around the disc adjacent to the edge. Stereo viewing is accomplished by positioning the stereo pair on opposite sides of the disc so that the pair may be viewed simultaneously through eyepieces 29A and 30A which align with the stereo pair through eyepiece openings 25A and 22A. An exterior handle 112 turns the disc within the light tight casing 110. Felt 115 or other means around the disc slot 111 maintains the light-tight condition as does the light-tight eyepieces 29A and 30A as described previously.

For a light-weight casing 110 plastic may be employed and even the lens system 62A could be inexpensive and light-weight plastic. As in the preferred embodiment light may be admitted through a clear window 63A by displacing a light-tight shutter 65A or the internal bulb 21A powered by self-contained batteries 28 may provide the light source activated by the nose or bridge of the nose of the user activating the light switch button 50A when the invention is in place for viewing.

The compass 19 and prism 20 system works in a similar fashion to that previously described by viewing the compass reading through one of the eyepieces, in this case eyepiece 30A. To move the protractor 122 to a desired position relative to the film 116 for taking a measurement, the protractor 122 is mounted on a threaded post 124 with an externally mounted control knob 118. Turning the knob 118 moves the protractor up and down the post 124. For lateral motion the bottom of the post is provided with rollers 126 and the post may be moved laterally within a light-tight slot 120 sealed with felt 115 or other resilient substance. Light is dispersed over the film 116 by the light spreader 66A.

As in the preferred embodiment printed information or landmarks or other helpful information concerning directions or land characteristics may be recorded on alternate film frames to the map frames for viewing and reading through the same system.

It is understood that the preceding description is given merely by way of illustration and not in limitation of the invention and that various modifications may be made thereto without departing from the spirit of the invention as claimed.

I claim:

1. A navigational aid combining a self-illuminated stereo micro-photographic map reader, a direction finder compass and a distance measuring protractor in one self-contained light-tight portable compartment, wherein the navigational aid comprises:
   a completely opaque casing with spaced viewing openings for two eyes of a user, wherein each viewing opening seals tight around each eye of the user while viewing emitting no light outside of the eyes of the viewer so that total light control is maintained;
   aligned with each viewing opening, a microphotographic reproduction of a landform, wherein each reproduction is taken from a perspective separated from the other reproduction by an average distance between two pupils of the eyes of a human;
   a self-powered internal source of light for illuminating the micro-photographic reproduction within the casing for viewing the reproduction and a means for activating and deactivating the light;
   a lens means for equally magnifying both reproductions when seen through the eyes of the user;
   at least one compass means of establishing direction viewable through at least one of the viewing openings simultaneously with viewing the reproduction;
   at least one protractor means of measuring the reproduction in relative scale, which protractor means is viewable through at least one of the viewing openings simultaneously with the reproduction, wherein the protractor appears to overlay the reproduction;
   a translucent panel behind the reproduction, which panel is normally closed to outside light by a shutter, which shutter may be opened to admit external light into the casing to illuminate the reproductions for viewing.

2. The invention of claim 1 wherein the micrographic reproductions comprise a pair of views of the same landform positioned on a strip of transparent film at a distance between the two equal to the average distance between pupils of the eyes of a human and wherein the film strip is mounted in a cartridge system comprising two rotatable spindles between which the film strip is rolled so that each view aligns with one of two spaced openings in the cartridge system for viewing by the user, and wherein an adjustable knob on the exterior of the casing controls the movement of the film strip between spindles.

3. The invention of claim 2 wherein the cartridge system is mounted on a threaded post within the casing and an adjustable knob on the exterior of the casing controls the movement of the cartridge system within the casing in a direction orthogonal to the direction of movement of the film strip.

4. The invention of claim 2 wherein the cartridge system further comprises a chemical means for destroying the film strip if necessary.

5. The invention of claim 1 wherein the internal light source is controlled by an on/off switch button mounted externally on the casing between the viewing openings so that when the user's eyes are in viewing position with a light tight pressure against the viewing openings, the light switch is then activated by the bridge of the nose of the user.

6. The invention of claim 5 wherein the internal source of light comprises a small light bulb behind each reproduction, wherein a translucent film between each bulb and each reproduction dispersed the light evenly over the reproduction and prevents overheating the reproduction and the light bulbs are powered by batteries mounted in the casing.

7. The invention of claim 1 wherein each viewing opening comprises an adjustable magnifying lens and, contacting the face of the user around the eye, a flexible rubberized gasket which surrounds the eye of the user, wherein the gasket comprises an enclosed cup tightly attached to the casing and the outer portion of the cup comprises an opening slit which is normally closed, which slit is forced upon by an outer flange flared open by pressure from the user's face.

8. The invention of claim 2 wherein the casing opens on a hinge for changing film cartridges and the casing seals tightly with a latching means upon closing.

9. The invention of claim 1 wherein the film is mounted on a flat disc with frames of film spaced around the disc adjacent to the external perimeter of the disc, with pairs of micrographic reproductions positioned on opposing sides of the disc to align with the two viewing openings.

10. The invention of claim 1 wherein the compass means comprises a standard 360 degree compass mounted in a base of the casing with the face of the compass showing into the interior of the casing, and further comprising a prism means mounted directly above the compass and within the line of sight of at least one of the viewing openings so that the image of the compass is viewed simultaneously with the image of the reproduction.

11. The invention of claim 1 wherein the protractor means comprises a standard protractor configuration to the scale of the rproductions, which protractor configuration is marked upon a thin transparent sheet which is mounted within the field of view of one of the viewing openings adjacent to one of the reproductions.

12. The invention of claim 2 wherein, between the two reproductions on the film strip, additional information is recorded on the film for viewing.

13. A navigational aid combining a self-illuminated microphotographic map reader, a direction finding compass and a distance measuring protractor in one self-contained light-tight portable compartment, wherein the navigational aid comprises:

a completely opaque casing with at least one viewing opening for an eye of a user, wherein the viewing opening contacts the face of the user around the eye, having a flexible rubberized gasket which surrounds the eye of the user, wherein the gasket comprises an enclosed cup tightly attached to the casing and the outer portion of the cup comprises an opening slit which is normally closed, which slit is forced open by an outer flange flared open by pressure from the user's face;

aligned with the viewing opening, a microphotographic reproduction of a landform;

a self-powered internal source of light for illuminating the microphotographic reproduction within the casing for viewing the reproduction and a means for activating and deactivating the light;

a lens means for magnifying the reproduction when seen through an eye of a user;

a compass means of establishing direction viewable through the viewing opening simultaneously with viewing the reproduction;

a protractor means of measuring the reproduction in relative scale, which protractor means if viewable through the viewing opening simultaneously with the reproduction and appearing to overlie the reproduction; and wherein the casing is mounted on a band and worn around a wrist of the user.

14. The invention of claim 13 wherein the compass means comprises a standard 360 degree compass mounted in a base of the casing with the face of the compass showing into the interior of the casing, and further comprising a prism means mounted directly above the compass and within the line of sight of the viewing opening so that the image of the compass reading is viewed simultaneously with the image of the reproduction.

15. The invention of claim 13 wherein the protractor means comprises a standard configuration to the scale of the reproduction, which protractor configuration is marked upon a thin transparent sheet which is mounted within the field of view of the viewing opening adjacent to the reproduction.

16. The invention of claim 13 wherein two viewing openings are positioned apart by the distance between pupils of human eyes and two reproductions are viewed one through each opening, wherein each reproduction is taken from a perspective separated from the other reproduction by an average distance between two pupils of the eyes of a human so that the image of the reproductions as viewed by the user appears to be three dimensional.

17. The invention of claim 13 wherein the lens means comprises a microscopic high magnification viewing element.

18. The invention of claim 13 wherein the microphotographic reproduction comprises a series of transparent films frames mounted in pairs on opposing sides around a circular disc.

19. A navigational aid combining a self-illuminated stereo micro-photographic map reader, a direction finder compass and a distance measuring protractor in one self-contained light-tight portable compartment, wherein the navigational aid comprises:

a completely opaque casing with spaced viewing openings for two eyes of a user, wherein each viewing opening contacts the face of the viewer around the eye, having a flexible rubberized gasket which surrounds the eye of the user, wherein the gasket comprises an enclosed cup tightly attached to the casing and the outer portion of the cup comprises an opening slit which is normally closed, which slit is forced open by an outer flange flared open by pressure from the user's face;

aligned with each viewing opening, a microphotographic reproduction of a landform, wherein each reproduction is taken from a perspective separated from the other reproduction by an average distance between two pupils of the eyes of a human;

a self-powered internal source of light for illuminating the micro-photographic reproduction within the casing for viewing the reproduction and a means for activating and deactivating the light;

a lens means for equally magnifying both reproductions when seen through the eyes of the user;

at least one compass means of establishing direction viewable through at least one of the viewing openings simultaneously with viewing the reproduction;

at least one protractor means of measuring the reproduction in relative scale, which protractor means is viewable through at least one of the viewing openings simultaneously with the reproduction, wherein the protractor appears to overlay the reproduction.

* * * * *